United States Patent
Miller et al.

(10) Patent No.: US 6,965,753 B1
(45) Date of Patent: Nov. 15, 2005

(54) APPARATUS FOR PERFORMING DOPPLER CORRECTION IN A WIRELESS COMMUNICATIONS SYSTEM

(75) Inventors: David S. Miller, Carlsbad, CA (US); Jeffrey A. Lorbeck, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 09/651,820

(22) Filed: Aug. 30, 2000

Related U.S. Application Data

(60) Provisional application No. 60/151,773, filed on Aug. 31, 1999.

(51) Int. Cl.[7] .................................. H04B 7/185
(52) U.S. Cl. .................. 455/12.1; 455/67.16; 455/427; 367/90; 367/94; 367/904
(58) Field of Search ................ 455/86, 67.16, 455/165.1, 183.1, 427, 12.1, 67.6; 375/344, 346, 373; 342/99–100, 352, 356, 357.05; 367/90, 94, 904

(56) References Cited

U.S. PATENT DOCUMENTS

| | | | |
|---|---|---|---|
| 3,864,634 A | | 2/1975 | Dragonetti et al. |
| 3,940,695 A | * | 2/1976 | Sickles, II ............ 455/69 |
| 4,001,690 A | * | 1/1977 | Mack et al. ............ 455/13.2 |
| 4,872,164 A | * | 10/1989 | Rieger ............ 370/321 |
| 5,095,538 A | | 3/1992 | Durboraw, III |
| 5,432,521 A | * | 7/1995 | Siwiak et al. ............ 342/352 |
| 5,463,400 A | | 10/1995 | Tayloe |
| 5,471,648 A | * | 11/1995 | Gourgue ............ 455/63 |
| 5,566,354 A | | 10/1996 | Sehloemer |
| 5,613,193 A | | 3/1997 | Ishikawa |
| 5,640,166 A | * | 6/1997 | Siwiak ............ 342/354 |
| 5,644,572 A | | 7/1997 | Olds et al. |
| 5,666,648 A | | 9/1997 | Stuart |
| 5,696,797 A | * | 12/1997 | Bucher et al. ............ 375/344 |
| 5,703,595 A | | 12/1997 | Tayloe et al. |
| 5,742,908 A | | 4/1998 | Dent |
| 5,745,072 A | * | 4/1998 | Jensen et al. ............ 342/104 |
| 5,874,913 A | * | 2/1999 | Blanchard et al. ............ 342/352 |
| 5,943,606 A | * | 8/1999 | Kremm et al. ............ 455/12.1 |
| 5,995,039 A | * | 11/1999 | Jensen et al. ............ 342/104 |
| 6,665,332 B1 | * | 12/2003 | Carlson et al. ............ 375/130 |

FOREIGN PATENT DOCUMENTS

| | | |
|---|---|---|
| EP | 0337269 | 4/1989 |
| WO | 9608882 | 3/1996 |

\* cited by examiner

*Primary Examiner*—William Trost
*Assistant Examiner*—Stephen D'Agosta
(74) *Attorney, Agent, or Firm*—Philip Wadsworth; Gregory G. Ogrod

(57) ABSTRACT

Apparatus for Doppler correction in a wireless communications system, including a first frequency synthesizer for generating a carrier signal oscillating at a rate responsive to a first input, a counter coupled to the first input for generating a Doppler compensation signal, the counter having a clock input, and a second frequency synthesizer coupled to the clock input for generating a clock signal oscillating at a rate responsive to a rate input. The rate input is adjusted over time according to a predetermined sequence so that the Doppler compensation signal compensates for the Doppler effect experienced by, for example, ground-to-satellite communications in a satellite communications system.

17 Claims, 9 Drawing Sheets

APPARATUS FOR PERFORMING DOPPLER CORRECTION IN A WIRELESS COMMUNICATIONS SYSTEM

This application claims the benefit of Provisional Application No. 60/151,773, filed Aug. 31, 1999.

BACKGROUND OF THE INVENTION

I. Field of the Invention

The present invention relates generally to wireless communications, and more particularly to correction of communications signals traversing between transmitting and receiving stations that are moving relative to each other, to compensate for Doppler effects.

II. Related Art

Today, wireless communications systems are used for a variety of purposes, including local and global telephonic communications, television broadcasts, and terrestrial positioning, just to name a few. One component of all of these systems is the relationship between a transmitting station and a receiving station and, more particularly, the relative velocity between the two stations. One example of this is in the field of ground to satellite communications. Depending upon the particular system, satellites might communicate with a variety of terrestrial stations, from fixed ground stations that are designed to handle a high volume of traffic, to wireless telephones carried by an individual user. Satellites may also communicate with other satellites moving in different orbital planes and/or in different directions. Other examples may include communications with and between high speed aircraft or even high speed trains, of the type found, for example, in Europe and Japan.

Designers of such communications systems must often compensate for Doppler effects where the transmitting station is moving relative to the receiving station(s) with which it is communicating. The Doppler effect was discovered by Christian Johann Doppler who first stated the principle in 1842. The Doppler effect is the apparent variation in the frequency of an emitted wave, as the source of the wave moves toward or away from the observer. Only the radial (approaching or receding) component of motion produces this phenomenon. If the source of a wave is approaching an observer, the apparent frequency increases and the apparent wavelength decreases. If the source is receding from an observer, the apparent frequency decreases and the apparent wavelength increases. If there are several observers, each moving radially at different speeds relative to the source of an EM field, every observer will perceive a unique frequency and wavelength for the EM field produced by the source.

The frequency perceived by an observer is determined as follows. Let the speed of propagation of an electromagnetic (EM) field, in meters per second (m/s), be represented by c, and the (radial) speed component of the observer (for example, the satellite) relative to the source (for example, the terrestrial transmitter), also in meters per second, be represented by v. Further, let the apparent (observed) frequency of the EM wave, in hertz (Hz), be represented by $f_{app}$, and the actual frequency, also in Hz, by f. Then:

$$f_{app} = f(1 \pm v/c)$$

In free space, the value of c is approximately 300,000,000 m/s. If the transmitter and receiver are moving (relatively) toward each other, the relative separation is decreasing and the velocity component of the equation is negative. Conversely, if the transmitter and receiver are moving (relatively) away from each other, the relative separation is increasing and the velocity component of the equation is positive.

The above formula is reasonably valid for velocities up to about 10 percent of the speed of light. For greater speeds, relativistic time dilation occurs, reducing the frequency and increasing the wavelength independently of Doppler effect.

The Doppler effect is significant in applications where the product of velocity and frequency is high enough so that bandwidth will be significantly affected. Such is the case with low-earth-orbit (LEO) satellite systems, where the frequency ranges are on the order of 1–2 GHz for forward link signals (that is, signals transmitted from a base station to a satellite) and on the order of 5–6 GHz for reverse link signals (that is, signals transmitted from a satellite to a base station). LEO satellites typically are constantly moving relative to each other and to points on the earth's surface. This causes variations in the frequencies and wavelengths of received signals. In geostationary satellite systems, Doppler effect is not a factor unless the end user (mobile transceiver) is moving a a high speed such as when on board a high-speed train or high-speed aircraft.

The Doppler effect can have a variety of effects on satellite communications, depending in part upon the types of signals used within the system. For example, the Doppler effect will cause an apparent shift in the carrier frequency for those ground-to-satellite communications signals employing a carrier. This effect is referred to as "frequency Doppler." For those signals that also employ a spreading code, such as code division multiple access (CDMA) signals, the Doppler effect will also cause an apparent shift in the period of the spreading code. This effect is referred to as "code Doppler." Though frequency Doppler and code Doppler are two manifestations of the same Doppler effect, the implications are quite different in terms of their impact on CDMA based satellite communication systems.

A need, therefore, exists for an improved apparatus that compensates for Doppler effects within a wireless communications system. This need is especially acute in satellite communications systems.

SUMMARY OF THE INVENTION

Briefly stated, the present invention is directed to an apparatus for Doppler correction in a wireless communications system. A first frequency synthesizer generates a carrier signal oscillating at a rate responsive to a first input. A counter coupled to the first input generates a Doppler compensation signal; the counter has a clock input. A second frequency synthesizer is coupled to the clock input for generating a clock signal oscillating at a rate responsive to a rate input. The rate input is adjusted over time according to a predetermined sequence so that the Doppler compensation signal compensates for the Doppler effect experienced by, for example, ground-to-satellite communications in a satellite communications system.

An advantage of the present invention is that ground-to-satellite (or satellite-to-ground), and other types of, transmissions are corrected to compensate for Doppler effects. In a CDMA system, for example, the apparent carrier frequency and code rate of the received signal is, therefore, the correct frequency expected by the system.

Another advantage of the present invention is that Doppler correction is accomplished in a preferred embodiment using a simple and inexpensive implementation. The rate input controls the Doppler compensation signal, and need only be updated infrequently as compared to updating the Doppler compensation signal directly.

BRIEF DESCRIPTION OF THE DRAWINGS

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

I. Overview of the Environment

Briefly stated, the present invention is directed to an apparatus for Doppler correction in a wireless communications system. The invention includes a first frequency synthesizer for generating a carrier signal oscillating at a rate responsive to a first input, a counter coupled to the first input for generating a Doppler compensation signal, the counter having a clock input, and a second frequency synthesizer coupled to the clock input for generating a clock signal oscillating at a rate responsive to a rate input. The rate input is adjusted over time according to a predetermined sequence so that the Doppler compensation signal compensates for the Doppler effect experienced by transmitting and receiving stations as they move relative to each other.

An exemplary type of wireless communications system that is affected by Doppler is a satellite communications system. The following description is presented in terms of a ground-to-satellite-to-ground communications system. However, it will be apparent to persons skilled in the relevant arts that this invention is equally applicable to terrestrial communications systems or satellite-to-satellite communications systems where Doppler is likely to affect the reception of wireless signals. In satellite communications systems in particular, signals are transmitted from a ground based gateway (or base station) to a satellite and from the satellite to a user terminal. Typically, user terminals (or UTs) are of three types: portable (hand-held), mobile (vehicle mounted) or stationary. Signals transmitted to or arriving at each type of UT are susceptible to Doppler. In an exemplary system, the satellite acts primarily as a relay (or "bent pipe") to relay the signals transmitted by the gateway to the UT or from the UT to the gateway. Typically, in order to minimize the cost and complexity of the UT, no correction takes place at the UT. The forward link signal transmitted from the gateway to the UT via the satellite is pre-corrected at the gateway and post-corrected at the satellite. More specifically, a gateway modulator (GMOD) pre-corrects the forward-link signal such that the carrier frequency of the transmission from the gateway appears at the satellite to be unaffected by the Doppler shift due to the relative motion of the satellite and gateway. It will be apparent to persons skilled in the relevant arts that this invention is applicable to either or both of pre-correction and post-correction of signals. For convenience, the following description is presented in terms of pre-correction.

Figure 1:
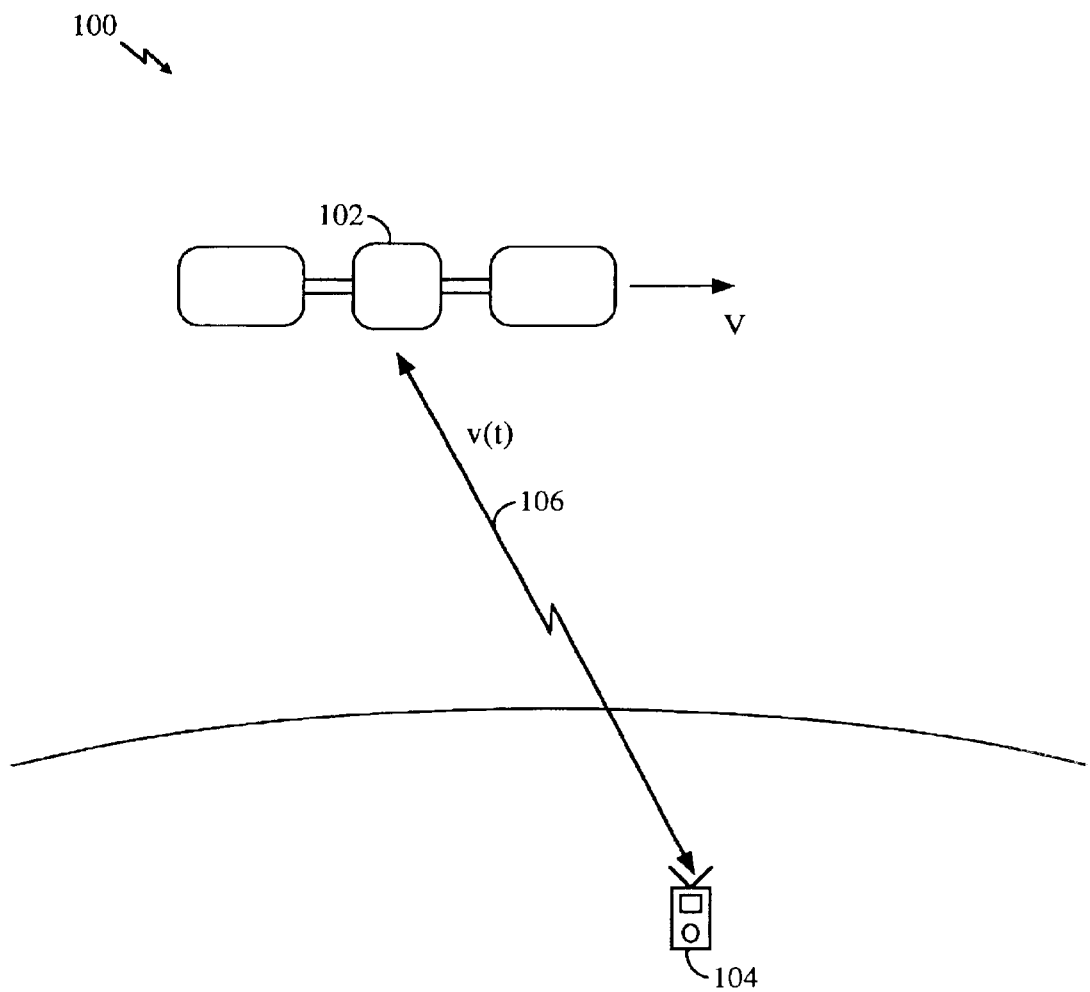
FIG. 1 depicts a satellite communications environment within which the present invention is used.

FIG. 1 depicts a satellite communications environment 100 within which the present invention is used. A terrestrial station 104 transmits a ground-to-satellite signal 106 (hereinafter "signal" 106 to a satellite 102 in orbit around the earth. Satellite 102 travels at an orbital velocity v' and at a radial velocity v(t) relative to terrestrial station 104. Signal 106 experiences Doppler effects due to the relative motion between satellite 102 and terrestrial station 104. The Doppler effect manifests as an apparent shift in the signal received by satellite 102, including, but not limited to, frequency Doppler effects and code Doppler effects.

Satellite 102 represents any satellite useful in transferring communication or information signals. For example, satellite 102 could send and receive television signals, mobile telephone signals, or geo-location signals. Those skilled in the art will recognize that satellites are used in a wide variety of applications. Generally, only those satellites not in a geostationary orbit (such as a LEO satellite) experience Doppler effects relative to points on the Earth's surface.

Similarly, terrestrial station 104 can represent any device capable of ground-to-satellite communications. For example, terrestrial station 104 can represent a gateway (or base station) designed to handle a large volume of ground-to-satellite signal traffic, a geolocation device such as a GPS receiver, or a mobile or portable wireless satellite telephone.

Ground-to-satellite signal 106 represents the signal transmissions appropriate to the particular satellite 102 and terrestrial station 104 in a system. Signal 106 experiences Doppler effects due to the relative radial motion between satellite 102 and terrestrial station 104. Signal 106 can represent, for example, a television broadcast, a GPS signal, or a mobile telephone call.

II. Overview of the Invention

Figure 2:
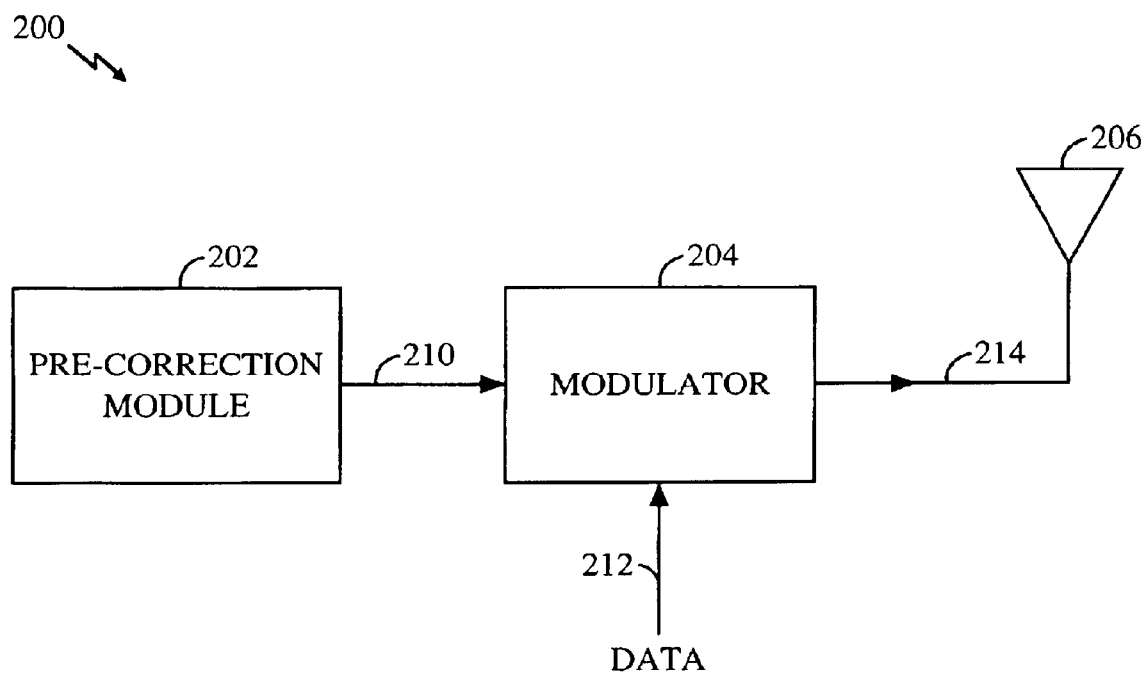
FIG. 2 depicts a transmitter that includes a pre-correction module coupled to a modulator and antenna according to the present invention.

FIG. 2 depicts a transmitter 200 according to the present invention including a pre-correction module 202, a modulator 204, and an antenna 206. Transmitter 200 is preferably employed by terrestrial station 104 for pre-corrected ground-to-satellite transmissions. However, those skilled in the art will recognize that transmitter 200 can also be employed by satellite 102 for pre-corrected satellite-to-ground transmissions.

Pre-correction module 202 generates a pre-corrected carrier signal 210. Modulator 204 uses pre-corrected carrier-signal 210 and a data signal 212 to generate a pre-corrected transmission signal 214 which is then transmitted via antenna 206. Pre-correction module 202 and modulator 204 are described in detail below.

III. Doppler Effects on Ground-To-Satellite Transmissions

Figure 3A:
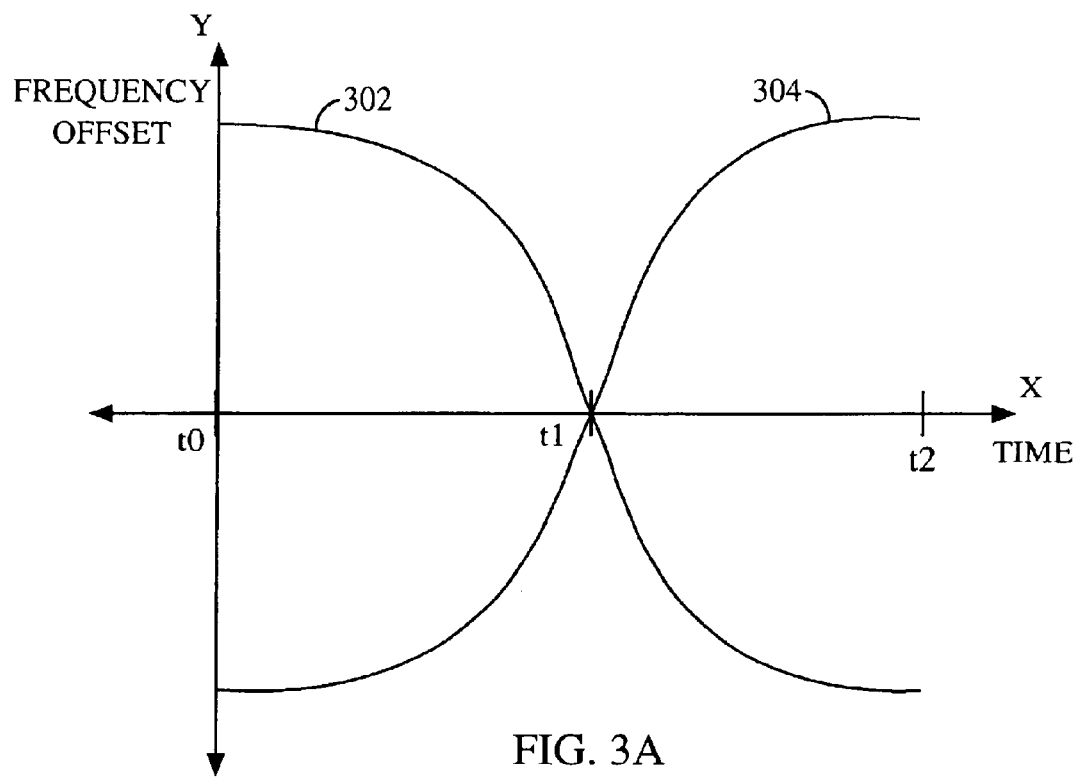
FIG. 3A depicts the Doppler frequency offset of a ground-to-satellite signal transmission as received by a moving satellite, and the ideal Doppler compensation signal to compensate for the Doppler effects.

FIG. 3A depicts an example frequency offset 302 caused by the Doppler effect on a ground-to-satellite transmission.

The x-axis represents time, and the y-axis represents the frequency offset caused by the Doppler effect, where zero frequency offset represents the presence of a signal at the frequency transmitted by terrestrial station 104. Those skilled in the art will recognize that this frequency offset will manifest differently depending upon the particular signal 106. For example, CDMA signals will experience both frequency Doppler and code Doppler effects.

In this example, satellite 102 is approaching terrestrial station 104 at a time $t_0$. Because satellite 102 is moving towards terrestrial station 104, the apparent frequency of signal 106 received at satellite 102 is higher than the transmitted frequency, indicated by a positive frequency offset. As satellite 102 moves closer to terrestrial station 104, the relative radial motion decreases as does the Doppler effect caused by the motion. The radial component of signal 106 is zero when satellite 102 is directly overhead at time $t_1$. Signal 106, therefore, experiences no Doppler effect at time $t_1$, as indicated by a zero frequency offset. As satellite 102 passes overhead and begins to move away from terrestrial station 104, signal 106 begins to experience a negative Doppler shift, as indicated by a negative frequency offset at time $t_2$. Clearly the Doppler effect produces a non-linear frequency offset over time.

FIG. 3A also depicts an ideal Doppler compensation signal 304, that if applied to signal 106 before transmission by terrestrial station 104, would compensate for the Doppler effects represented by frequency offset 302. This is referred to herein as Doppler pre-correction. For example, at time $t_0$ signal 106 is pre-corrected by a frequency downshift given by ideal compensation signal 304. This pre-correction cancels the positive frequency shift caused by the Doppler effect, so that signal 106 appears to satellite 102 to have the nominal frequency. Similarly, at time $t_2$ signal 106 is pre-corrected by a frequency upshift given by ideal compensation signal 304 which cancels the negative Doppler frequency shift.

IV. Transmitter with Doppler Pre-Correction

Figure 4:
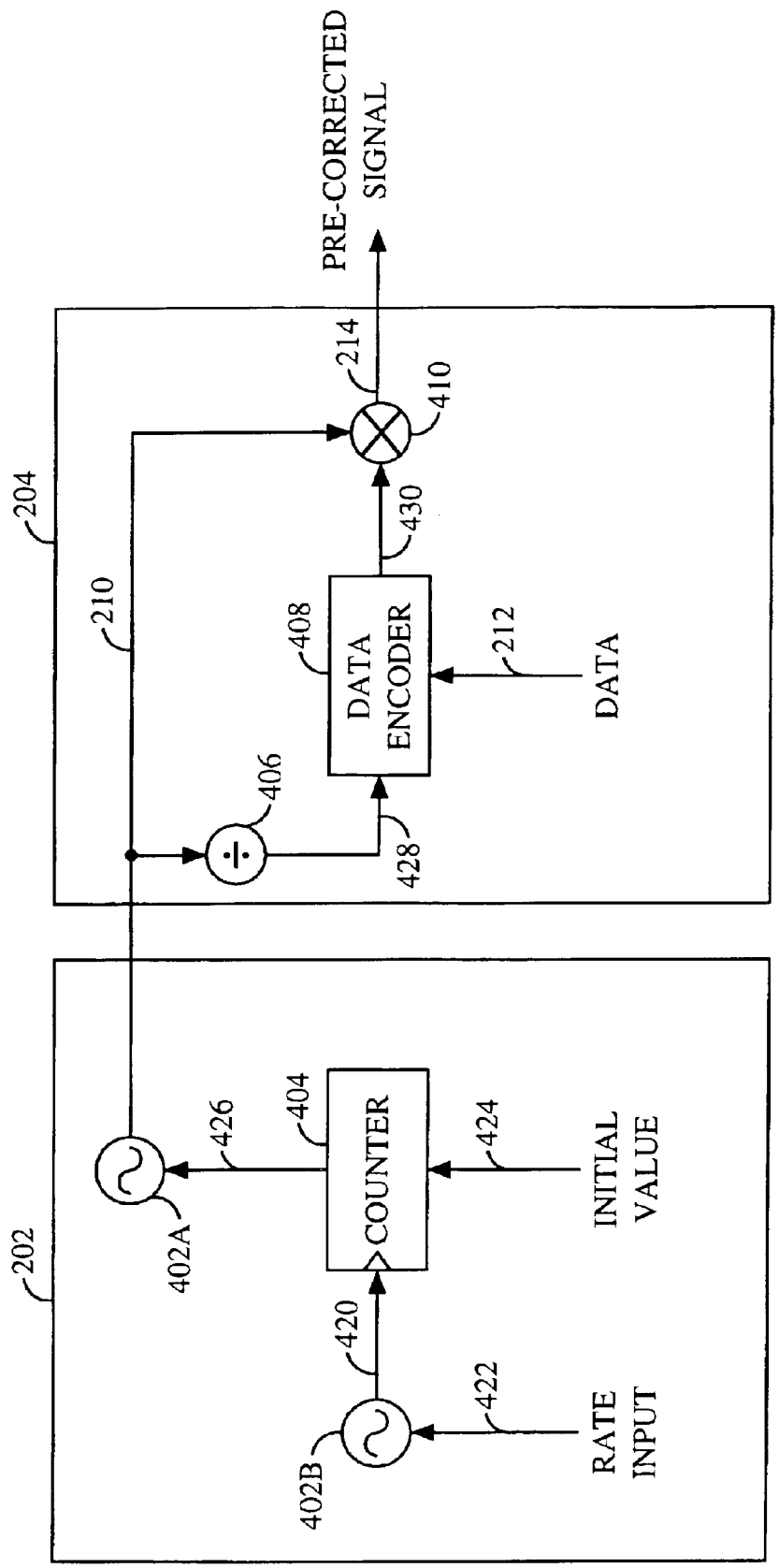
FIG. 4 illustrates the pre-correction module and modulator in greater detail.

FIG. 4 depicts transmitter 200 in greater detail according to a preferred embodiment of the present invention. Pre-correction module 202 includes a first frequency synthesizer 402A, a second frequency synthesizer 402B, and a counter 404. Modulator 204 includes a frequency divider 406, a data encoder 408, and a mixer 410.

Frequency synthesizer 402A generates pre-corrected carrier signal 210 having a frequency determined by a Doppler compensation signal 426. The frequency of pre-corrected carrier signal 210 is centered at the nominal carrier frequency of the communication system, and offset by an amount determined by Doppler compensation signal 426. For example, the nominal carrier frequency could be 5 GHz with the Doppler compensation signal varying between −1 KHz and +1 KHz, resulting in pre-corrected carrier signal 210 have a carrier frequency of 5 GHz±1 KHz. Those skilled in the art will recognize that frequency synthesizer 402A could be implemented using any one of a variety of adjustable frequency synthesizers known in the relevant art. The choice of a particular frequency synthesizer will depend, in part, on the particular frequency ranges of interest and other constraints such as available space and expense.

Counter 404 preferably represents a digital counter well known in the relevant art. Counter 404 generates an N-bit output (Doppler compensation signal 426) that begins with an initial value 424 and counts at a rate determined by a clock signal 420. Again, the choice of a particular digital counter will depend, in part, on the frequencies at which the counter must operate and other constraints such as available space and expense.

The counter's clock signal is provided by second frequency synthesizer 402B, which operates in a fashion similar to frequency synthesizer 402A. The frequency of clock signal 420 is set by a rate input 422. Rate input 422 varies over time, and is preferably characterized by a predetermined sequence of values as described below.

Figure 3B:
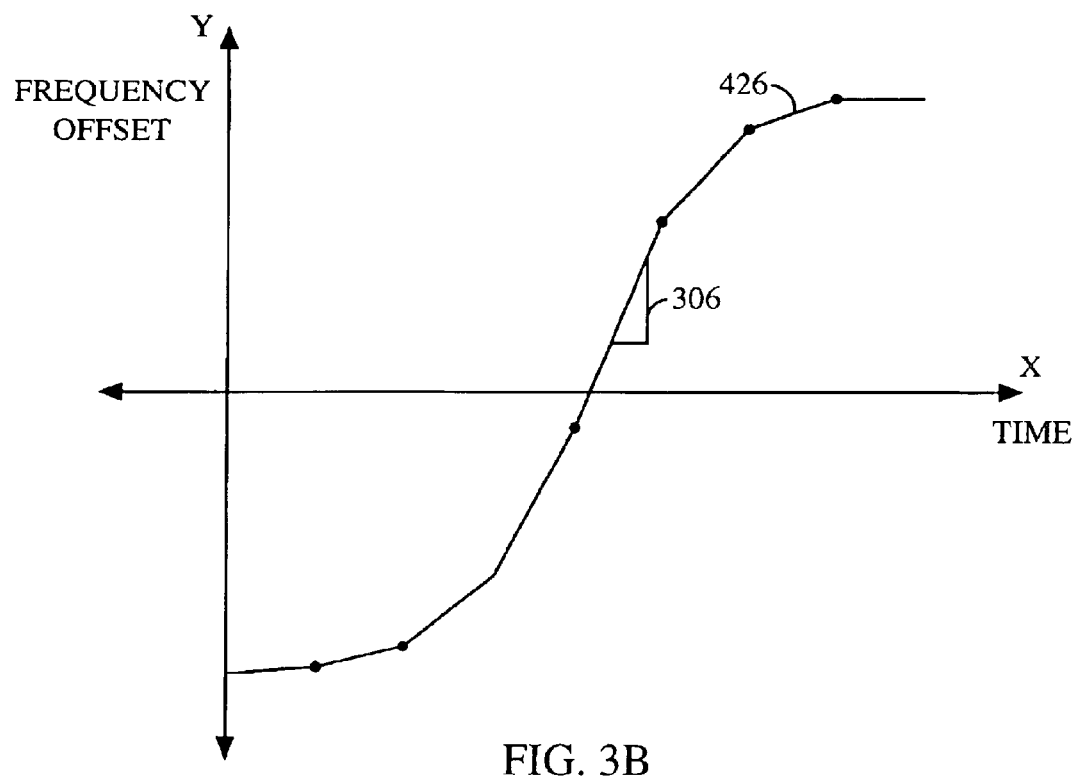
FIG. 3B depicts an example Doppler compensation signal generated according to a preferred embodiment of the present invention.

FIG. 3B depicts an example Doppler compensation signal 426 generated by the combined operation of counter 404 and frequency synthesizer 402B. Doppler compensation signal 426 ideally approaches ideal compensation signal 304. However, relatively sophisticated hardware would be required to generate a Doppler compensation signal that exactly matches the ideal. For example, the values of ideal compensation signal 304 could be stored in a memory and provided to frequency synthesizer 402A over time, rather than using counter 404. This implementation would require a memory capable of delivering data at a very high rate in order to achieve a high resolution.

In a preferred embodiment of the present invention, the clock rate of counter 404 is varied according to rate input 422 to produce Doppler compensation signal 426. The frequency of clock signal 420 determines the rate at which counter 404 increments its N-bit output (Doppler compensation signal 426). Assuming that the value at which counter 404 increments remains constant, varying the rate at which the counter increments has the effect of varying the slope of Doppler compensation signal 426, depicted in FIG. 3B as slope 306. Increasing the frequency of clock signal 420 increases the slope of Doppler compensation signal 426, and vice versa with decreasing the clock frequency. As the value of rate input 422 changes, the slope changes. This accounts for the segmented appearance of Doppler compensation signal 426 as shown in FIG. 3B. Each point shown on the curve corresponds to a time at which a new rate input value 422 is provided to frequency synthesizer 402B.

For the example shown in FIG. 3B, Doppler compensation signal 426 is preferably generated by setting initial value 424 to equal the point at which the signal meets the y-axis, and rate input 422 is set to produce the desired slope. Some time later, rate input 422 is updated to produce the slope of the second segment shown in FIG. 3B. In this manner, the shape of Doppler compensation signal 426 can be controlled to match as closely as necessary or desired for the particular system the shape of ideal compensation signal 304.

Those skilled in the art will recognize that the various parameters can be altered to achieve a better or worse approximation to the ideal. For instance, increasing the frequency with which rate input 422 is updated will increase the granularity of Doppler compensation signal 426, and allow for a closer match to the ideal. Increasing the rate at which the clock increments (with a corresponding scaling factor to ensure that the proper slope is maintained) also provides for a more granular approximation. Though FIG. 3B depicts a periodic update rate for the value of rate input 422, this is not required. In an alternative embodiment, the rate input 422 is aperiodic, with faster updating during periods of faster change of Doppler compensation signal 426, and slower updating during periods of slow change. Those skilled in the art will recognize that other such improvements can be gained by altering the update rate of rate input 422 and the frequency of clock signal 420.

Figure 5:
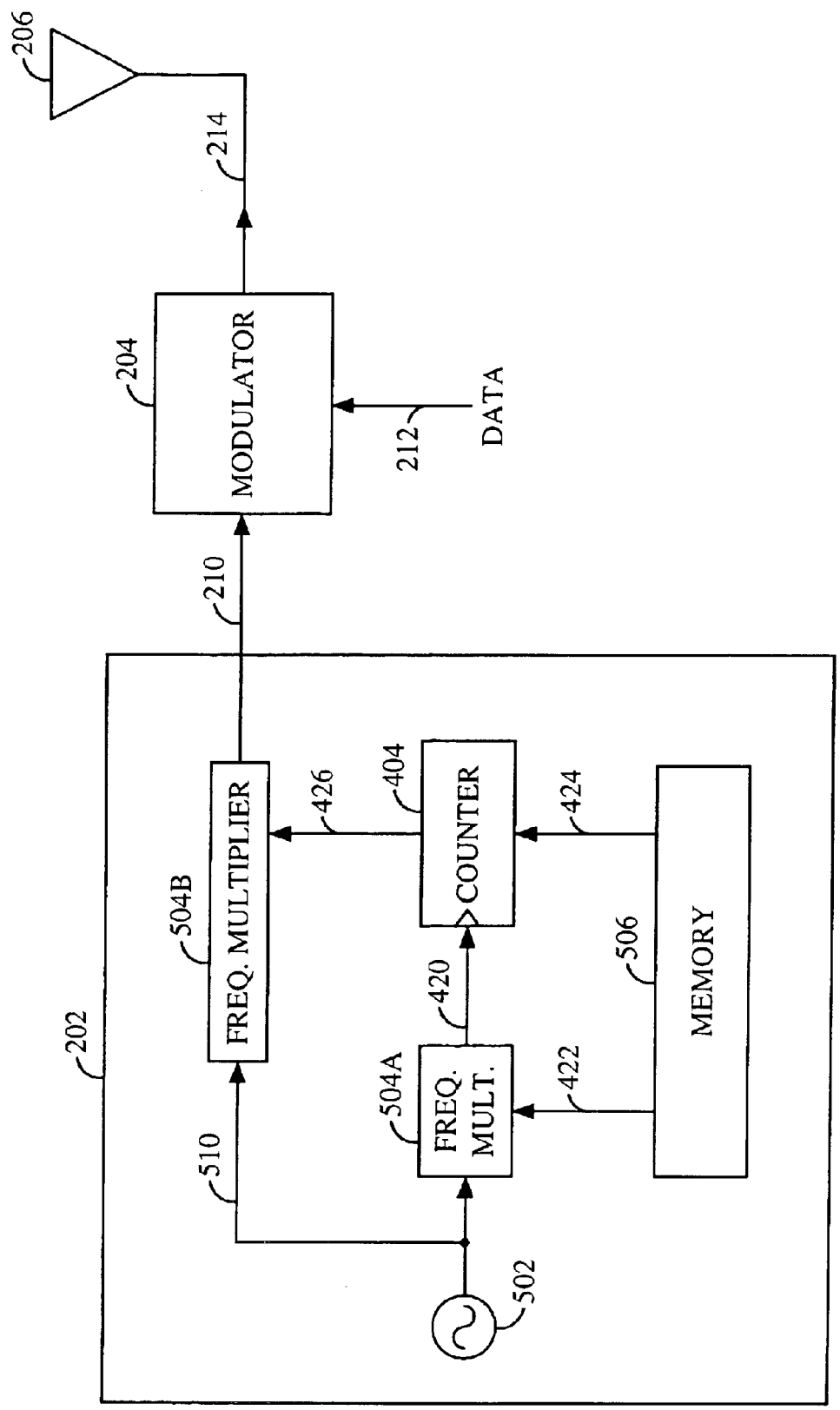
FIG. 5 depicts an embodiment of a pre-correction module having a single oscillator and two frequency multipliers.

FIG. 5 depicts a preferred implementation of pre-correction module 202 and frequency synthesizers 402A and 402B. Here, a single frequency synthesizer 502 and frequency multipliers 504A and 504B replace frequency synthesizers 402A and 402B. This implementation operates in the same manner as described above with respect to FIG. 4. Synthesizer 502 outputs a signal 510 which is provided as an input to each of the frequency multipliers which then provide the appropriate signals 210 and 420. Also, a memory 506 is used to supply the desired sequence of values for rate input 422 and initial value 424.

Returning to FIG. 4, an example embodiment for modulator 204 is also depicted for a CDMA modulation scheme. As discussed above, the Doppler effect as applied to a CDMA signal results in both frequency Doppler effects and code Doppler effects. In order to provide proper pre-correction, both the carrier frequency and the code rate must be compensated because both are subject to the Doppler effect. The embodiment depicted in FIG. 4 assumes that the code rate is a multiple of the carrier frequency, which is often the case in practice. As shown, pre-corrected carrier signal 210 is input to frequency divider 406 which performs the necessary conversion from the carrier frequency to the code rate, forming coding clock signal 428. Data encoder 408 modulates data signal 212 using coding clock signal 428, resulting in coded data signal 430. Mixer 410 modulates coded data signal 430 by pre-corrected carrier signal 210 to form pre-corrected transmission signal 214. Note that for the case where the carrier frequency is not a multiple of the code rate, a second pre-correction modulation can be used to independently generate a pre-corrected coding clock signal.

Those skilled in the art will recognize that modulator 204 can take many forms, depending upon the particular modulation scheme. Furthermore, different modulation types are going to exhibit various effects from the Doppler effect, frequency Doppler and code Doppler effects being the most common.

The following portion of this disclosure describes the method or algorithms used to provide the gateway modulator (GMOD) circuitry or elements, generally implemented in the form of ASICs, with periodic updates of Doppler information required by the GMODs to pre-correct the forward-link transmission for frequency and code Doppler effects. Also disclosed is the digital circuitry on the GMODs that processes the periodic updates of Doppler information and the fixed-point effects of this digital processing.

A fundamental consideration in this discussion is that Doppler effects are changing too rapidly for the gateway controller (GC) to communicate in real time to each modulator card (MC) upon which a series of GMODs (in this example there are eight) are placed. The GC will instead provide each MC with periodic updates of Doppler information. The MCs relay this information to each GMOD which then calculates the required Doppler information between periodic updates.

Figure 6:
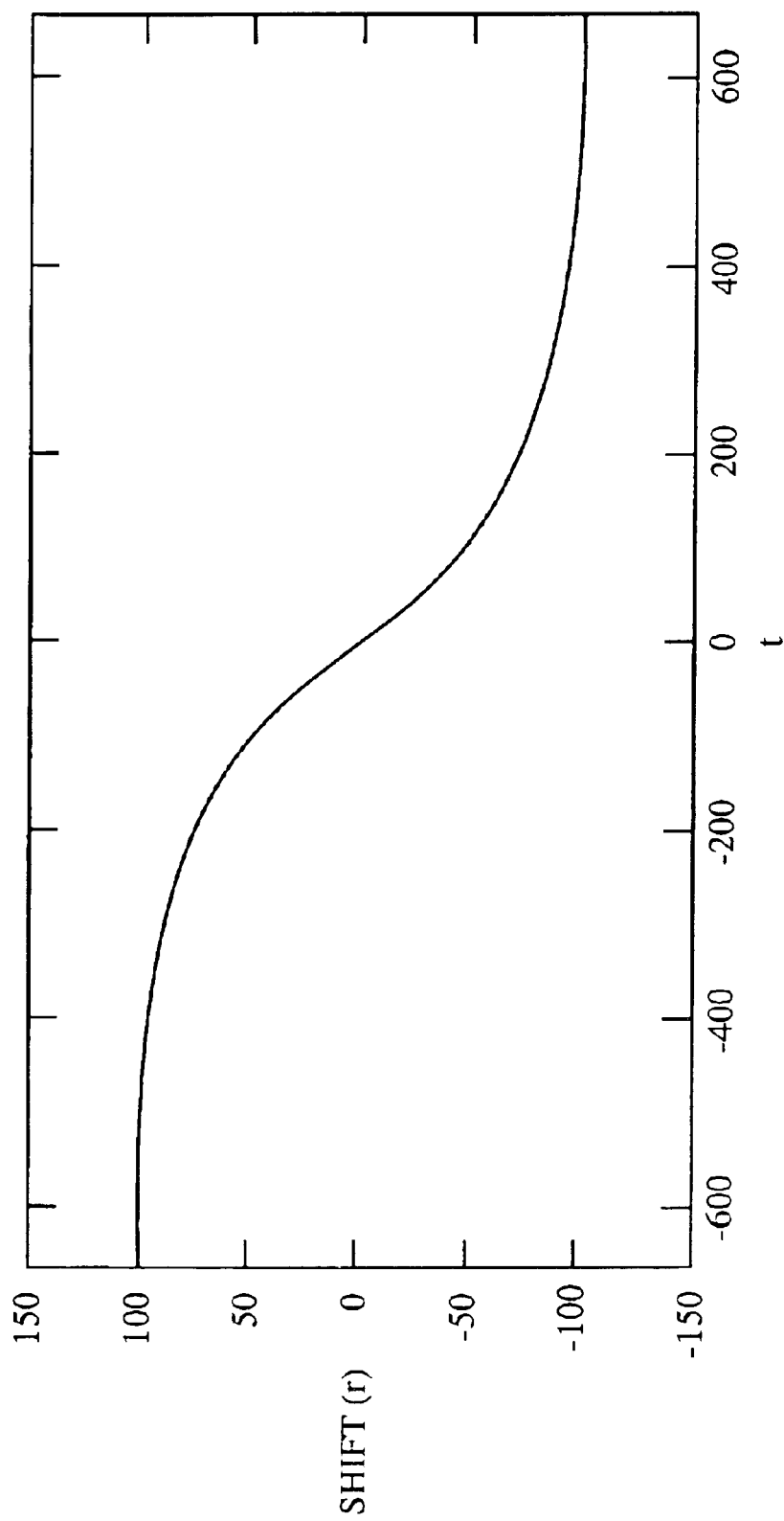
FIG. 6. shows relationship for the impact of Doppler shift (kHz) on signals for a satellite passing directly overhead, with a transmission carrier frequency of 5.125 GHz versus time of flight(s)

The GMODs pre-correct the forward-link signal such that the carrier frequency of the transmission from the gateway appears at the satellite to be unaffected by the Doppler shift due to the relative motion of the satellite and gateway. The pre-correction is effected by complex rotation of the I and Q sample stream in the digital domain. The Doppler shift as a function of time is shown in FIG. 6, which indicates the result for a satellite passing directly overhead and for a gateway transmit carrier frequency of 5.125 GHz.

The maximum rate of change of the Doppler shift occurs as a satellite passes directly overhead and is about 0.1 ppm/s times the carrier frequency, or about 512.5 Hz/s with a carrier of 5.125 GHz. It is not practicable for the GC to calculate the Doppler shift and transmit this information to each MC in real time. The GC will instead provide each MC with Doppler information on a periodic (e.g., once per second, or other desired period) basis. The MCs will relay this information to the GMODs which perform real-time Doppler calculations in hardware.

The Doppler information provided by the GC to the MCs is the rotation frequency and the time rate of change of rotation frequency at periodic intervals. In fact, however, after an initial frequency is provided to each GMOD at the start of the first time interval, only the rate of change of frequency will be used at the start of subsequent intervals. The frequency of the complex rotation, $f_r$, is the sum of a fine channelization frequency and the frequency required to compensate for the Doppler shift as seen by the relationship:

$$f_r = f_{chan} - f_c\left(\frac{v(t)/c}{1 - v(t)/c}\right),$$

where
$f_{chan}$=fine channelization frequency,
$f_c$=desired carrier frequency,
v(t)=relative satellite-to-gateway velocity, and
c=speed of light.

For small v(t)/c, the denominator of the second term in the equation above may be approximated by unity (but should NOT be approximated in the actual calculations). The Doppler correction is thus nearly equal to the Doppler shift. It would be nearly equal to the negative of the Doppler shift were it not for a spectral inversion which occurs in the analog upconverters following the GMODs.

Figure 7:
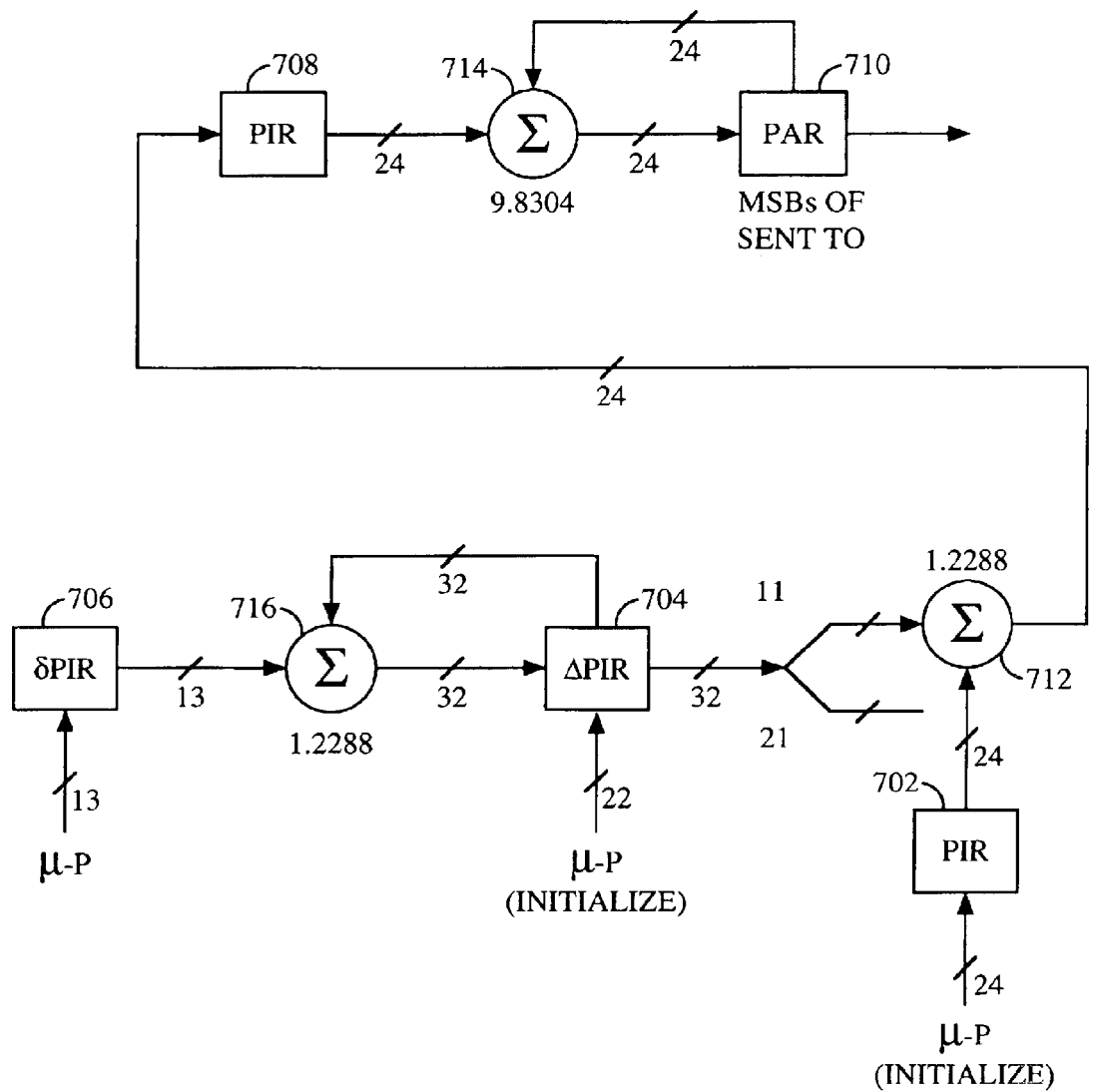
FIG. 7 shows frequency and phase accumulators for Doppler frequency pre-correction.
Figure 8:
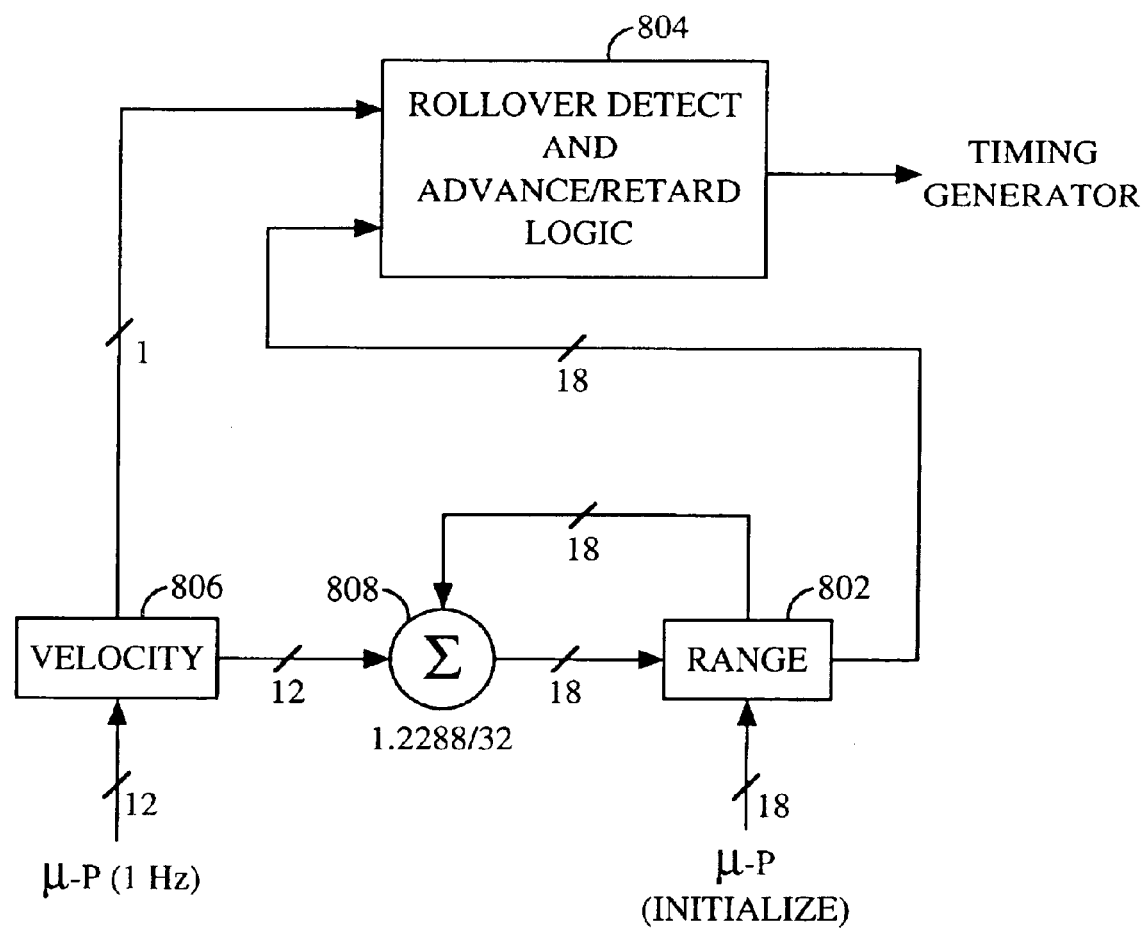
FIG. 8 shows a timing pre-correction range accumulator.

The frequency and phase accumulators for Doppler frequency pre-correction are shown in FIG. 7. The bit widths indicated are representative. The actual values will be chosen based upon the frequency errors which are introduced by fixed-point effects. The frequency accumulation is effected in the lower portion of the circuit. At the beginning of the first 1-s interval the initial frequency will be loaded into a phase increment register (PIR$_o$) 702. To increase the resolution of this frequency value, additional fractional bits of the initial frequency are loaded into a $\Delta_{PIR}$ register 704. The initial rate of change of frequency is loaded into a $\delta_{PIR}$ register 706. The value in register 702 and the most significant integer bits (MSBs) of the value in register 704 (at the first time step the integer bits are all zero) are added together using a summation element or adder 712 to form the frequency value in a phase increment register (PIR) 708. The value in a phase accumulation register (PAR) 710 is determined by addition, at every cycle of the phase accumulation clock, of the phase increment in register 708 using a summation element or adder 714. The MSBs of the value in register 710 then become the phase value used by a CORDIC (not shown) to rotate the input I and Q channels. The CORDIC is a COordinate Rotation DIgital Computer. It is essentially an algorithm for computing sines and cosines based on a method which is simple and efficient for digital hardware to implement. Only the MSBs of register 710 are used to reduce the amount of hardware required in the CORDIC. The number of MSBs determines the level of phase modulation (PM) spurs at the output of the CORDIC.

The value in register 704 is increasing or decreasing during the first 1-s interval by addition, at every cycle of the frequency accumulation clock, of the value loaded into register 706, using a summation element or adder 716. The clock rate of the phase accumulation (9.8304 MHz in FIG. 7) and the frequency accumulation (1.2288 MHz) are not necessarily equal. A new value for register 708 is determined by addition of the value in register 702 and the MSBs of register 704 (output of adder 712) at the frequency accumulation clock rate.

At the end of a first interval δt, the value of register 708 is stored in register 702, the integer bits (MSBs) of register 704 are set to zero, and the fractional value in register 704 is sign extended. In other words, the remaining fractional value should have the same sign as the value before the integer value is removed. A new value of register 706 is loaded from the MC. Hence, the only additional information generally required by the frequency and phase accumulators following the first interval is the value to be loaded into register 706 which is proportional to the satellite acceleration.

The sizes of the registers and the frequency and phase accumulation clock rates are chosen following a consideration of fixed-point effects. If the clock rate of the phase accumulator is denoted as $f_{p\_clk}$ and an N-bit phase accumulator register is assumed, the frequency resolution Δf of the complex rotation is given as:

$$\Delta f = \frac{f_{p\_clk}}{2^N}.$$

With $f_{p\_clk}$=9.8304 MHz and N=24, for example, a frequency resolution of Δf=0.5859 Hz is obtained. While a sub-Hz frequency resolution seems quite small, suppose that the desired frequency is constant over a 1-s interval and that it is posiitoned exactly between two quantized frequency values. After an interval Δt, the total integrated phase error $\Phi_{err}$ in radians due to the difference between the desired and quantized frequencies will be given by the relationship:

$$\phi_{err} = 2\pi \frac{\Delta f}{2} \Delta t.$$

Using the values assumed above with Δt=2 s yields $\Phi_{err}$=211°. This level of phase error is unacceptable for the Doppler count technique (the total integrated phase error arising from frequency error due to fixed-point effects at the satellite should be below about 10°) which estimates the offset and linear drift of the wireless device's oscillator, for example a phone transmitter crystal oscillator (TCXO). Offset and linear drift of the forward-link carrier frequency at the satellite will be combined with the values obtained for phone TCXO frequency error. However, if the gateway is transmitting over multiple channels to the same phone, the frequency error due to fixed-point effects (e.g., frequency quantization) will differ on a channel-by-channel basis.

The GMODs pre-correct the forward-link signal such that the code timing of the transmission from the gateway appears at the satellite to be unaffected by the relative motion of the satellite and gateway. The motion results in a changing path delay leading to a time rate of change of code timing known simply as code Doppler.

Time is pre-corrected by integrating the relative satellite to gateway velocity over time intervals δt (chosen for convenience to be of the same duration as the frequency update intervals) and advancing or retarding the timing on the GMOD circuit processing elements, logic, or ASICs by ⅛ of the PN chip period (which is 101.73 ns in the above example) whenever the relative satellite to gateway range increases or decreases by an amount equal to ⅛-PN chip (for the chip rate being used) times the speed of light, i.e., (101.73 ns)(0.29979 m/ns)=30.496 m. (The error on the satellite position due to error in the orbital ephemerides provided by the ground operation command center or other central command or information source is slowly varying in time and will have little effect upon the satellite velocity calculations.).

Time pre-correction is more coarsely discretized than frequency pre-correction even though code Doppler results in a time rate of change of code timing of 20 ppm and frequency Doppler results in frequency shifts of 20 ppm as well. The quantization of time pre-correction may result in a maximum timing error of ¹⁄₁₆-PN chip (here 50.86 ns). This error affects mobile position determination (MPD) relying on round-trip delay (RTD) measurements. These methods do not require the timing to be pre-corrected using as fine a relative step size as the frequency pre-correction where the error mechanism of MPD based on Doppler count is the primary driver on the accuracy requirements.

The range accumulator is less complex than the frequency and phase accumulators described above. The accumulator integrates constant values of velocity over time intervals δt in order to obtain the range modulo 30.496 m, or ⅛ PN chip period when expressed in time units. This is similar to the phase accumulation register integrating frequency modulo 2π radians. The logic following the range accumulator detects a roll-over in the range register. A rollover indicates that a timing correction is required, while the sign of the velocity determines whether the GMOD timing should be advanced or retarded.

A range register 802, of size P is initially loaded to half its terminal value of $2^P-1$. The register rolls over when the integrated range, measured in time units, changes by more than ¹⁄₁₆ PN chip, which is detected by rollover detect logic 804. After the first time correction, the range must change by ⅛ PN chip before a roll-over is detected leading to a timing error. An accumulator 806 integrates constant values of velocity over time intervals δt in order to obtain the range modulo ⅛ PN chip period. This value is added to the range using a summation element or adder 808. The time-tracking loops in the fingers of a rake receiver in a wireless device will not be able to track the instantaneous jumps in timing. This will lead to timing offset that decreases the energy of the "on-time" samples and increases the interchip interference.

The resolution of the range, Δr, is given by the relationship:

$$\Delta r = \frac{c \cdot (1/8 PNchip)}{2^P} \cong \frac{30.496m}{2^P}.$$

With a range register (RR) 802 of size P=18, for example, one obtains a range resolution of 0.1 mm. This level of resolution may seem excessive, although it impacts the accuracy with which the range may be tracked from interval to interval. If the range accumulator is running at a rate of $f_{r\_clk}$, then the smallest non-zero variation in range over an interval is:

$$\delta t \cdot f_{r\_clk} \cdot \Delta r.$$

Using δt=1 s and $f_{r\_clk}$=1.2288/32 MHz leads to a minimum range variation of 4.5 m equivalent to a 15 ns path delay variation. The minimum range variation may become quite large even for small (several mm) range resolution Δr.

Figure 9:
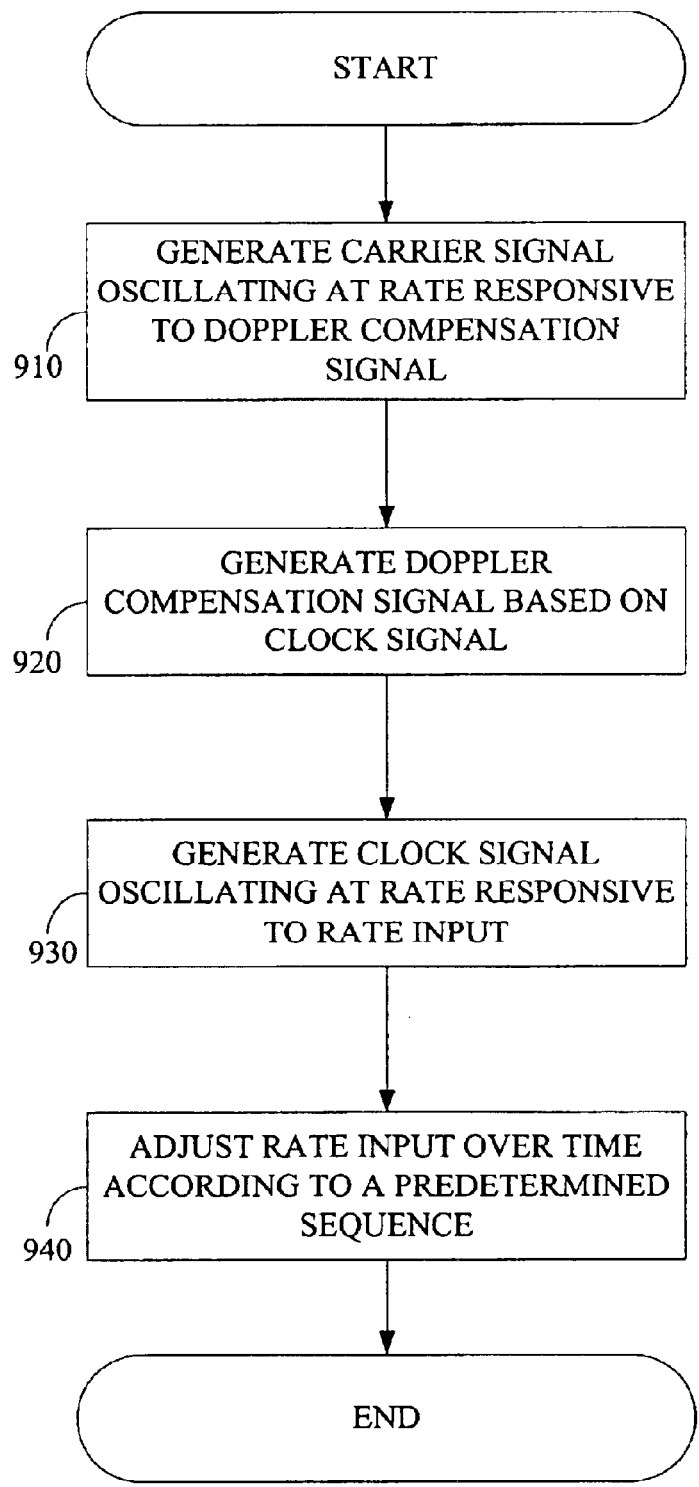
FIG. 9 shows a method for frequency correction of Doppler effects.

FIG. 9 shows a method for frequency correction of Doppler effects in a wireless communications system comprising generating a carrier signal oscillating at a rate responsive to a Doppler compensation signal (910); generating said Doppler compensation signal based on a clock signal (920); generating said clock signal oscillating at a rate responsive to a rate input (930); and adjusting said rate input over time according to a predetermined sequence so that said Doppler compensation signal compensates for said Doppler effect (940).

V. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What we claim as our invention is:

1. Apparatus for Doppler correction in a wireless communications system, wherein signals transferred within the system to receiving user terminals experience a Doppler effect that varies over time in relation to a user terminal position, comprising:
   a first frequency synthesizer for generating a carrier signal for the transfer of data that is oscillating at a rate responsive to a first input;
   a counter coupled to said first input for generating a Doppler compensation signal having a predetermined rate of change as Doppler changes over time, said counter having a clock input;
   a second frequency synthesizer coupled to said clock input for generating a clock signal oscillating at a rate responsive to a rate input;
   a rate input signal generator outputting a rate input signal coupled to said second frequency synthesizer rate input so as to adjust said rate input over time so that said Doppler compensation signal is a time varying magnitude signal with a slope that varies at a changing rate over time as to compensates for said Doppler effect at varying rates as it changes over time; and
   wherein said counter is configured to have an increment value that is held substantially constant, and variations in the rate at which the counter increments in response to said second frequency synthesizer output varies the slope of said Doppler compensation signal.

2. The apparatus according to claim 1, wherein the wireless communications system comprises a satellite communications system including an earth-based gateway, a satellite, and a user terminal, and said frequency correction apparatus is located at said earth based gateway.

3. The apparatus for frequency Doppler correction of claim 1, wherein increasing the rate of the clock incrementing increases the slope of said Doppler compensation signal.

4. The apparatus for frequency Doppler correction of claim 1, wherein decreasing the rate of the clock incrementing decreases the slope of said Doppler compensation signal.

5. The apparatus for frequency Doppler correction of claim 1 wherein said counter generates an N-bit output Doppler compensation signal, said counter commencing counting with an initial value and counting at a rate determined by a clock signal; and
   a frequency of said clock signal being set by a rate input which varies over time for a given signal for which compensation is being implemented.

6. The apparatus for Doppler correction of claim 1 wherein said rate input is updated on an infrequent basis.

7. The apparatus for Doppler correction of claim 1 wherein said rate input is updated in an aperiodic manner, with faster updating during periods of faster change of Doppler compensation signal, and slower updating during periods of slow change.

8. A system for frequency correcting transmissions between first and second transceivers in a wireless communications system to minimize Doppler effects, comprising:
   carrier generating means in the first transceiver for generating a carrier signal oscillating at a rate responsive to a first input;
   Doppler compensation means coupled to said carrier generating means for generating a Doppler compensation signal having a predetermined rate of change as Doppler changes over time;
   clock generating means coupled to a clock input of said Doppler compensation means for generating a clock signal oscillating at a rate responsive to a predetermined rate;
   rate input means coupled to said clock generating means and adjustable over time so as to adjust said Doppler compensation signal to be a time varying magnitude signal with a slope that varies at a changing rate over time which compensates for said Doppler effect at varying rates as it changes over time; and
   wherein said clock generating means is configured to have an increment value that is held substantially constant, and variations in the rate at which the Doppler compensation means increments in response to said clock generating means output varies the slope of said Doppler compensation signal.

9. The system according to claim 8, wherein the wireless communications system comprises a satellite communications system including an earth-based gateway incorporating the first transceiver, a satellite incorporating the second transceiver, and a user terminal.

10. Apparatus for Doppler correction in a wireless communications system, wherein signals are generated as spread spectrum encoded communication signals and as transferred within at least a portion of the system experience a code or frequency Doppler effect that varies over time, comprising:
    a first frequency synthesizer for generating a carrier signal for the transfer of data that is oscillating at a rate responsive to a first input;
    a counter coupled to said first input for generating an N-bit output Doppler compensation signal having a predetermined rate of change as it changes over time, said counter having a clock input and commencing counting with an initial value and counting at a rate determined by a clock signal at said clock input;
    a second frequency synthesizer coupled to said clock input for generating a clock signal oscillating at a rate responsive to a rate input with a frequency of said clock signal being set by said rate input which varies over time for a given signal for which compensation is being implemented; and
    a rate input signal generator outputting a rate input signal coupled to said second frequency synthesizer rate input so as to adjust said rate input over time so that said Doppler compensation signal is a time varying magnitude signal with a slope that varies at a changing rate over time so as to compensates for said Doppler effect at varying rates as it changes over time.

11. The apparatus for Doppler correction of claim 10 wherein communication signals traverse between transmitting and receiving stations that are moving relative to each other resulting in said code Doppler.

12. The apparatus for Doppler correction of claim 10 wherein said signal is pre-corrected at a communication system gateway and post-corrected at a satellite.

13. The apparatus for code Doppler correction of claim 10 wherein the frequency with which rate input is updated is increased to increase the granularity of Doppler compensation signal and allow for a closer match to a representative ideal value.

14. The apparatus for code Doppler correction of claim 10 wherein the rate at which the clock increments is increased and a corresponding scaling factor applied to ensure a proper slope is maintained to provide for a more granular approximation.

15. The apparatus for code Doppler correction of claim 10 further comprising frequency and phase accumulators having bit width values based upon the frequency errors which are introduced by fixed-point effects.

16. A method for compensating for carrier frequency and code Doppler in a communication system employing CDMA spread spectrum modulated signals, comprising:
- modulating a data signal using a coding clock signal so as to produce a coded data signal;
- modulating said coded data signal by a pre-corrected carrier signal to form a pre-corrected transmission signal;
- modulating said coded data signal by a second pre-correction modulation to independently generate a pre-corrected coding clock signal when the carrier frequency is not a multiple of the code rate.

17. A method for correction of Doppler effects in a wireless communications system, comprising:
- generating a carrier signal oscillating at a rate responsive to a Doppler compensation signal;
- generating said Doppler compensation signal based on a clock signal having a predetermined rate of change as Doppler changes over time;
- generating said clock signal oscillating at a rate responsive to a rate input;
- adjusting said rate input over time according to a predetermined sequence so that said Doppler compensation signal is a time varying magnitude signal with a slope that varies at a changing rate over time which compensates for said Doppler effect at varying rates as it changes over time; and
- incrementing said clock signal at a value that is held substantially constant, with variations in the rate at which the Doppler compensation signal is adjusted in response to said clock signal varies the slope of said Doppler compensation signal.

\* \* \* \* \*